(12) United States Patent
Uchiumi

(10) Patent No.: US 11,169,966 B2
(45) Date of Patent: Nov. 9, 2021

(54) INFORMATION PROCESSING APPARATUS AND NON-TRANSITORY COMPUTER READABLE MEDIUM STORING INFORMATION PROCESSING PROGRAM FOR HIDDEN FILE TRACING

(71) Applicant: FUJIFILM Business Innovation Corp., Tokyo (JP)

(72) Inventor: Yohei Uchiumi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 16/529,763

(22) Filed: Aug. 1, 2019

(65) Prior Publication Data
US 2020/0293492 A1    Sep. 17, 2020

(30) Foreign Application Priority Data
Mar. 14, 2019    (JP) .............................. JP2019-046750

(51) Int. Cl.
*G06F 17/00* (2019.01)
*G06F 16/14* (2019.01)
*G06F 40/166* (2020.01)
*G06F 3/0484* (2013.01)

(52) U.S. Cl.
CPC .......... *G06F 16/156* (2019.01); *G06F 40/166* (2020.01); *G06F 3/04845* (2013.01)

(58) Field of Classification Search
None
See application file for complete search history.

(56) References Cited

U.S. PATENT DOCUMENTS

| | | | | |
|---|---|---|---|---|
| 5,852,440 A | * | 12/1998 | Grossman | G06F 3/0481 715/811 |
| 7,770,135 B2 | * | 8/2010 | Fitzmaurice | G06F 3/0482 715/856 |
| 9,569,064 B2 | * | 2/2017 | John | G06F 3/04812 |
| 2004/0117727 A1 | * | 6/2004 | Wada | G06F 1/1694 715/273 |
| 2008/0307359 A1 | * | 12/2008 | Louch | G06F 3/0481 715/835 |
| 2009/0234843 A1 | * | 9/2009 | Ito | G06F 16/358 |
| 2009/0240715 A1 | * | 9/2009 | Ito | G06Q 10/10 |
| 2009/0307623 A1 | * | 12/2009 | Agarawala | G06F 3/04815 715/765 |
| 2010/0077291 A1 | * | 3/2010 | Takahashi | G06F 40/169 715/230 |
| 2010/0169832 A1 | * | 7/2010 | Chang | G06F 16/954 715/811 |

(Continued)

FOREIGN PATENT DOCUMENTS

| | | |
|---|---|---|
| JP | 2009223409 | 10/2009 |
| JP | 2014021552 | 2/2014 |

*Primary Examiner* — Mustafa A Amin
(74) *Attorney, Agent, or Firm* — JCIPRNET

(57) ABSTRACT

An information processing apparatus includes a display control section that performs control of displaying plural files stored in a real storage area on a display area representing a virtual storage area; an association section that generates relevant data in which the plural files displayed in the display area are associated with each other; and a storage section that stores the relevant data in a referable location in a case where the display area is hidden.

28 Claims, 11 Drawing Sheets

| EVALUATION REFERENCE | WEIGHT (100 IN TOTAL) |
|---|---|
| DEGREE OF COINCIDENCE BY FILE NAME | 20 |
| DEGREE OF COINCIDENCE BY ATTRIBUTE | 15 |
| DEGREE OF COINCIDENCE BY FEATURE WORD EXTRACTION OF FILE CONTENT | 10 |
| DISTANCE IN WORK SPACE | 20 |
| EXECUTION STATE OF ASSEMBLING/DISASSEMBLING | 15 |
| DISPLAY TIME TO WORK SPACE | 20 |

(56) References Cited

U.S. PATENT DOCUMENTS

| | | | | |
|---|---|---|---|---|
| 2011/0029526 A1* | 2/2011 | Knight | ............... | G06F 16/287 |
| | | | | 707/737 |
| 2014/0108978 A1* | 4/2014 | Yu | ............... | G06F 3/04817 |
| | | | | 715/765 |
| 2014/0149431 A1* | 5/2014 | Mochizuki | ............... | G06F 16/93 |
| | | | | 707/749 |
| 2015/0127323 A1* | 5/2015 | Jacquet | ............... | G06F 40/211 |
| | | | | 704/9 |

\* cited by examiner

FIG. 3

| FILE NAME | ATTRIBUTE | CONTENT |
|---|---|---|
| OVERSEAS CONSIGNMENT FEE APPLICATION FORM.docx | KEYWORD: PAYMENT PROCESS | xxxx … |
| EXCHANGE CHART_NOV2018.xlsx | CREATOR: UTSUMI | yyyy … |
| TRAIL CONFIRMATION CHECK SHEET.pptx | KEYWORD: PAYMENT PROCESS | zzzz … |

| POSITIONAL RELATIONSHIP | DISPLAY TIME TO WORK SPACE | ORIGINAL POSITION |
|---|---|---|
| – (BASIC FILE) | – (BASIC FILE) | ¥¥file-share¥shinsei |
| DISTANCE 20 pt | AFTER 5.6 SECONDS | ¥¥file-share¥sankou¥ |
| DISTANCE 50 pt | AFTER 32.2 SECONDS | ¥¥file-share¥sankou¥ |

FIG. 6

| EVALUATION REFERENCE | WEIGHT (100 IN TOTAL) |
|---|---|
| DEGREE OF COINCIDENCE BY FILE NAME | 20 |
| DEGREE OF COINCIDENCE BY ATTRIBUTE | 15 |
| DEGREE OF COINCIDENCE BY FEATURE WORD EXTRACTION OF FILE CONTENT | 10 |
| DISTANCE IN WORK SPACE | 20 |
| EXECUTION STATE OF ASSEMBLING/DISASSEMBLING | 15 |
| DISPLAY TIME TO WORK SPACE | 20 |

FIG. 7

| FILE NAME | DEGREE OF ASSOCIATION (MAXIMUM 100 POINT) | ORIGINAL POSITION (RELATIVE PATH BASED ON BASIC FILE) |
|---|---|---|
| OVERSEAS CONSIGNMENT FEE APPLICATION FORM.docx | (BASIC FILE) | (BASIC FILE) |
| EXCHANGE CHART_NOV2018.xlsx | 77 | ../sankou¥ |
| TRAIL CONFIRMATION CHECK SHEET.pptx | 28 | ../sankou¥ |

FIG. 8

| BASIC FILE NAME | DEGREE OF ASSOCIATION OF SCORE (MAXIMUM 100 POINT) | POSITION OF BASIC FILE |
|---|---|---|
| OVERSEAS CONSIGNMENT FEE APPLICATION FORM.docx | 77 | ¥¥file-share¥shinsei |

INFORMATION PROCESSING APPARATUS AND NON-TRANSITORY COMPUTER READABLE MEDIUM STORING INFORMATION PROCESSING PROGRAM FOR HIDDEN FILE TRACING

CROSS-REFERENCE TO RELATED APPLICATIONS

This application is based on and claims priority under 35 USC 119 from Japanese Patent Application No. 2019-046750 filed Mar. 14, 2019.

BACKGROUND

(i) Technical Field

The present invention relates to an information processing apparatus and a non-transitory computer readable medium storing an information processing program.

(ii) Related Art

In the related art, a technology of associating files stored in a folder with each other is known.

For example, JP2009-223409A discloses a document searching system in which relevant information extracted from a work space and a folder is managed on a storage unit, a candidate of a relevant document associated with a specific document is selected by using those pieces of information, and a relevant document list is generated from a result of a weighting process on each candidate.

In addition, for example, JP2014-021552A discloses a business document processing system which calculates a deletion possibility probability based on file data deleted in the past, determines whether a folder can be deleted from a bias of the deletion possibility probability for a file immediately below a file, automatically excludes only necessary file from a deletion target for a folder in which most files are determined to be unnecessary, presents and confirms files other than the deletion target, and collectively deletes the files other than the deletion target from a file server.

On the other hand, there is a technology of displaying a plurality of files in one display area and overwriting a plurality of files after an operation on an original storage area after a user performs the operation on the plurality of files. Since the plurality of files displayed in the display area are files associated with each other for the user, in some cases, even after the display area is hidden, the user wants to trace a relation so as to obtain the file or the like.

SUMMARY

Aspects of non-limiting embodiments of the present disclosure relate to an information processing apparatus and a non-transitory computer readable medium storing an information processing program capable of tracing, in a case where a plurality of files stored in a real storage area are displayed on a display area representing a virtual storage area and an operation is performed on the plurality of files displayed on the display area, a relationship between the files displayed on the display area after the display area is hidden.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including: a display control section that performs control of displaying a plurality of files stored in a real storage area on a display area representing a virtual storage area; an association section that generates relevant data in which the plurality of files displayed on the display area are associated with each other; and a storage section that stores the relevant data in a referable location in a case where the display area is hidden.

BRIEF DESCRIPTION OF THE DRAWINGS

Exemplary embodiment (s) of the present invention will be described in detail based on the following figures, wherein:

FIG. 3 is a table illustrating management items in three files illustrated in FIG. 2;

FIG. 6 is a table illustrating an evaluation reference of a degree of association;

FIG. 7 is a diagram illustrating an example of relevant data generated based on management items illustrated in FIG. 3;

FIG. 8 is a diagram illustrating another example of the relevant data;

DETAILED DESCRIPTION

Hereinafter, exemplary embodiments of the present invention will be described with reference to the accompanying drawings.

Figure 1:
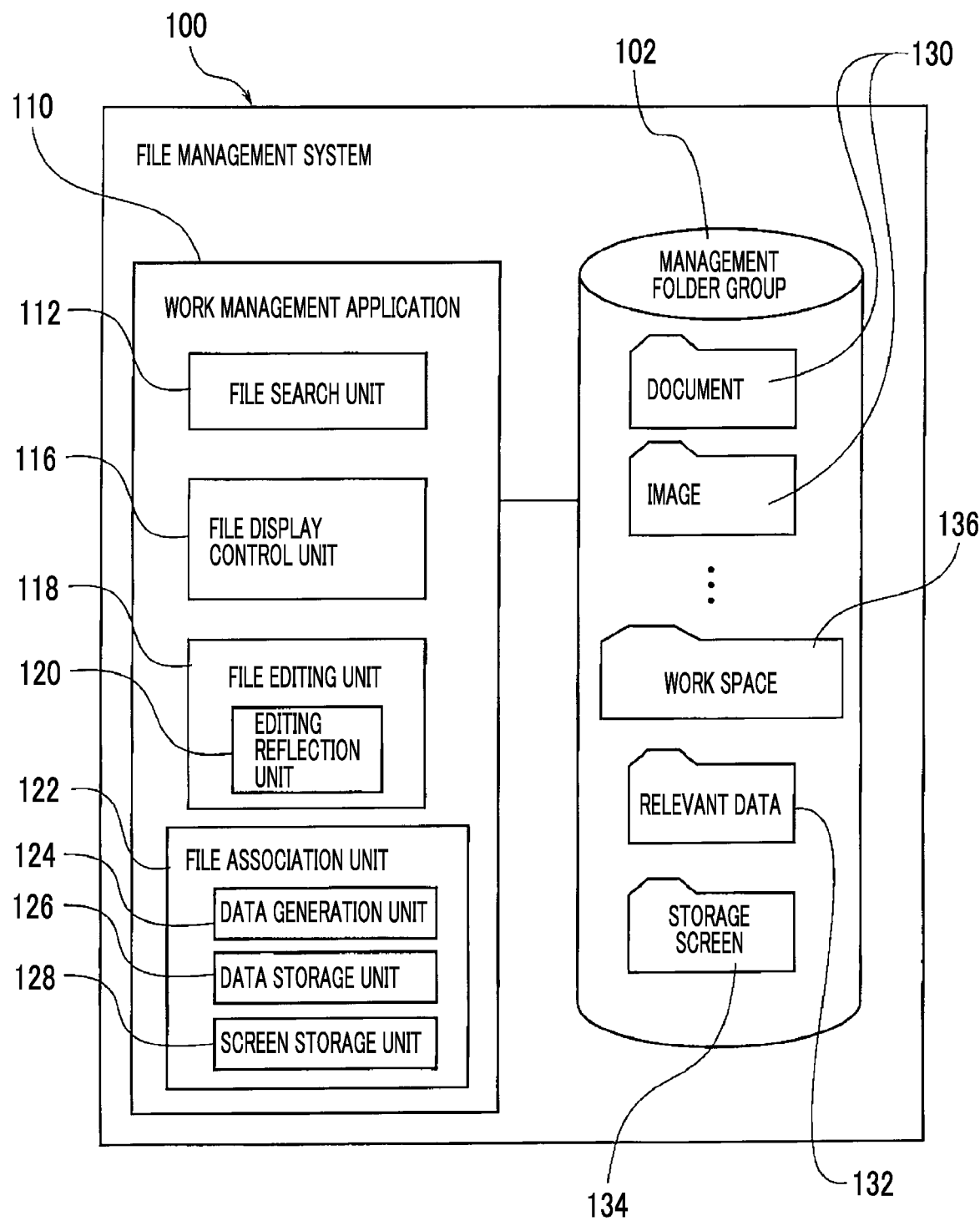
FIG. 1 is a schematic configuration diagram of a file management system in which an information processing apparatus according to an exemplary embodiment of the present invention is incorporated.

FIG. 1 is a schematic configuration diagram of a file management system in which an information processing apparatus according to an exemplary embodiment of the present invention is incorporated.

A file management system 100 is a system configured to include one or more computers as hardware. The file management system 100 manages a file stored in each folder 130 of a management folder group 102 incorporated in the system. In each folder 130 of the management folder group 102, various files such as a document file, an image file, a moving image file, and the like are stored.

In addition, in the present exemplary embodiment, it is assumed that files are stored in each folder 130 of the management folder group 102 after being organized by type classification or the like. In some cases, the organized file in each folder 130 of the management folder group 102 is managed as a file shared by, for example, one department, one team, or the like. The management folder group 102 corresponds to an example of "real storage area" according to the exemplary embodiment of the present invention.

The file management system 100 has a function of organizing files in each folder 130 and a function of changing a file organization structure, but the description of those functions is omitted.

In a case where work is performed by using a file stored in the management folder group 102, a plurality of files stored in each of a plurality of folders 130 are often referred to. In this case, it becomes complicated to refer to or edit the file while being stored in each of the plurality of folders 130 as it is. However, in a case where a file is moved from each folder 130 for work, there is a risk that an organization state of the file may be disturbed.

Therefore, a work management application 110 corresponding to an embodiment of an information processing apparatus of the exemplary embodiment of the present invention is incorporated in the file management system 100.

The work management application 110 is application software for performing work of referring to and editing files stored in the folder 130 without disturbing the organization state of the files in the management folder group 102. The work management application 110 displays a file necessary for work in the work space 136 which is a folder included in the management folder group 102. The work management application 110 illustrated in FIG. 1 represents a program structure of this application software, and also represents a functional structure of an exemplary embodiment of the information processing apparatus of the exemplary embodiment of the present invention built on hardware of the file management system 100 by the application software.

The work space 136 is a special folder distinguished from each folder 130 of the management folder group 102. The work management application 110 displays a file not by moving the file from each folder 130 to the work space 136 but by generating a copy of the file in the work space 136, for example. In addition, the copy of the file generated in the work space 136 and the original file are internally associated by the work management application 110, and after the work, an operation on the file displayed in the work space 136 is reflected in the file stored in the original folder 130.

The work space 136 corresponds to an example of "virtual storage area" according to the exemplary embodiment of the present invention. In the present invention, a storage area in which a substance of a file is stored is defined as "real storage area", and a storage area in which the substance of the file is not stored but a copy of the file is stored is defined as "virtual storage area".

The file may be displayed in the work space 136 by generating an icon linked to the file in the work space 136, for example.

Hereinafter, details of the work management application 110 will be described with reference to FIG. 1 and other drawings.

Figure 2:
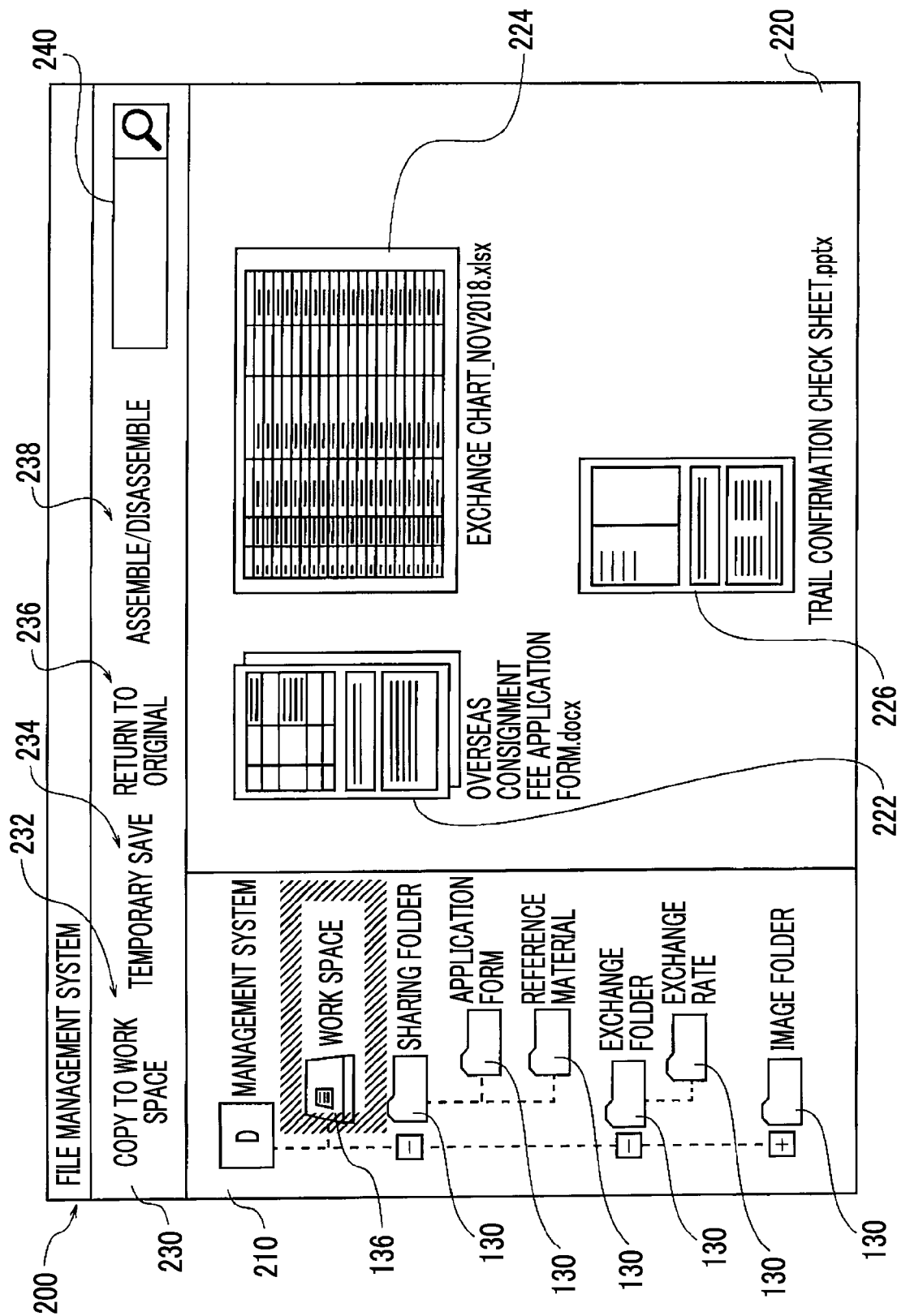
FIG. 2 is a diagram illustrating a file management screen displayed by the file management system.

FIG. 2 is a diagram illustrating a file management screen displayed by the file management system.

A folder display field 210, a file display field 220, and a menu bar 230 are provided in a file management screen 200.

In the folder display field 210, each folder 130 of the management folder group 102 is displayed in a so-called tree structure, and the work space 136 is also displayed.

The file display field 220 displays the folder 130 selected in the folder display field 210, or a file or a subfolder in the work space 136. FIG. 2 illustrates a case where the work space 136 is selected as an example, and in the file display field 220, three of files 222, 224, and 226 are illustrated as an example.

The files 222, 224 and 226 in the file display field 220 in a case where the work space 136 is selected is displayed by a file display control unit 116 of the work management application 110. The file display field 220 in a case where the work space 136 is selected corresponds to an example of a display area according to the exemplary embodiment of the present invention, and the file display control unit 116 corresponds to an example of a display control section according to the exemplary embodiment of the present invention.

Each of the files 222, 224 and 226 displayed in the file display field 220 is selected from each folder 130 by a user and is displayed in the work space 136. The file display control unit 116 arranges the files 222, 224 and 226 at positions appropriated to work in the file display field 220 in response to, for example, a mouse operation of the user.

Among the files 222, 224, and 226 displayed in the file display field 220, a file selected first by the user is hereinafter referred to as a basic file. In the example illustrated in FIG. 2, it is assumed that the file 222 disposed at the upper left is a basic file. The user performs a reference operation or an editing operation on each of the files 222, 224 and 226 in the work space 136 via the file display field 220 so as to refer to and edit a content. A file editing unit 118 of the work management application 110 receives the editing operation. In a case where the files 222, 224 and 226 are referred to, it is also possible to turn pages on the work space 136 for files having a plurality of pages.

A plurality of operation items 232, 234, 236, and 238 and a file search unit 240 are displayed in parallel, on the menu bar 230. The operation item of the "copy to work space" 232 on the menu bar 230 is an operation item for displaying a file selected and operated by the user in each folder 130 of the management folder group 102, on the work space 136. In a case where the user selects the "copy to work space" 232, the file display control unit 116 of the work management application 110 displays a copy of the file on the work space 136. As described above, an icon may be displayed as a substitute for copying. In the following description, in some cases, display of the copy of the file on the work space 136 is expressed simply as display of the file on the work space 136.

Here, a specific example of items managed by the work management application 110 for three of the files 222, 224, and 226 illustrated in FIG. 2 will be described.

FIG. 3 is a table illustrating management items in the three files illustrated in FIG. 2.

In FIG. 3, "file name", "attribute", "content", "positional relationship", "display time to work space", and "original position" are illustrated as management items. Among these management items, "file name", "attribute" and "content" are items copied from an original file. "Attribute" is additional information predeterminately given to the file, and additional information such as a title, a subtitle, a creator, a keyword, a comment, a user definition, or the like may be given as "attribute".

Among the management items, "positional relationship", "display time to work space", and "original position" are items generated by the file display control unit 116 of the work management application 110 in a case where the file is displayed on the work space 136. "Original position" is a path of a folder in which the original file is stored.

As "positional relationship" and "display time to work space", a relative value based on a basic file is calculated. In the example illustrated in FIG. 2, as described above, the file 222 at the upper left is a basic file, and the file 224 right next to the basic file is displayed at a distance of 20 points from the basic file after 5.6 seconds of display of the basic file. In addition, the file 226 at the lower right of the basic file is displayed at a distance of 50 points from the basic file after 32.2 seconds of display of the basic file.

Returning to FIG. 2, the description will be continued.

The operation item of the "temporary save" 234 on the menu bar 230 is an operation item for moving a file displayed in the work space 136 to other work while the file is left in the virtual storage area. In a case where the operation item of the "temporary save" 234 is selected and operated by the user, a subfolder for temporary storage is generated, and each of the files 222, 224, and 226 displayed in the file display field 220 is moved to the subfolder.

The operation item of the "return to original" 236 on the menu bar 230 is an operation item for reflecting each of the files 222, 224, and 226 displayed in the file display field 220 into each of files stored in the original folder 130. In a case where the operation item of the "return to original" 236 is selected and operated by the user, an editing content for each of the files 222, 224, and 226 is reflected in the original file stored in the each folder 130 by an editing reflection unit 120 in the file editing unit 118 of the work management application 110. Each of the files 222, 224, and 226 is deleted from the work space 136. The editing reflection unit 120 corresponds to an example of an editing reflection section according to the exemplary embodiment of the present invention.

In a case where any one of the operation items of the "temporary save" 234 and the "return to original" 236 is selected and operated, a file association unit 122 of the work management application 110 generates and stores relevant data. The relevant data will be described in detail below.

The operation item of the "assemble/disassemble" 238 on the menu bar 230 is an operation item for assembling or disassembling the files 222, 224, and 226 on the work space 136. A selection operation on these operation items is also received by the file editing unit 118 of the work management application 110, and editing corresponding to the selected operation item is performed on the files 222, 224, and 226.

In a case where the operation item of the "assemble/disassemble" 238 is selected by the user, a plurality of files selected on the work space 136 are assembled into one file.

Figure 4:
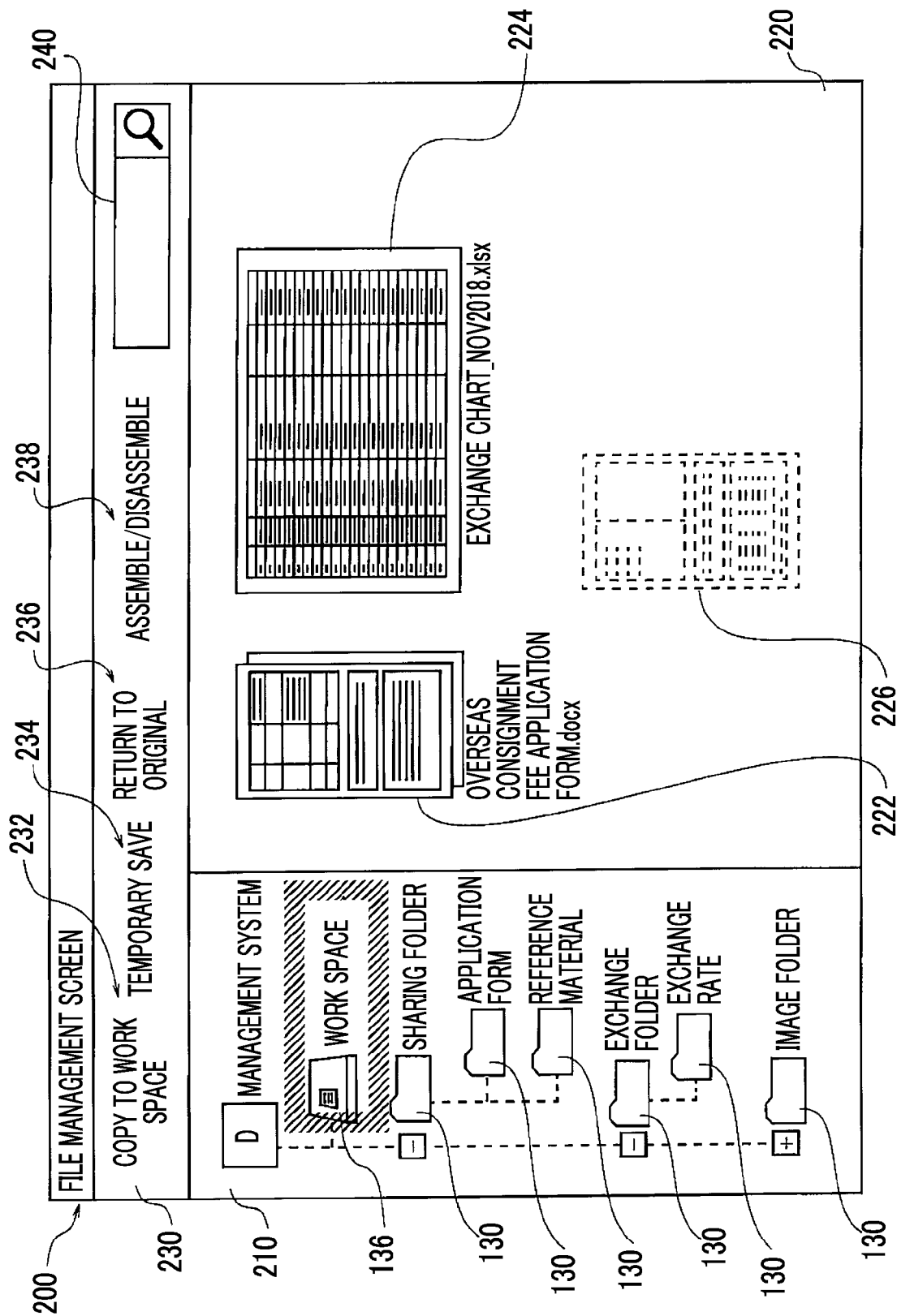
FIG. 4 is a diagram illustrating an example in which "assemble/disassemble" is operated.

FIG. 4 is a diagram illustrating an example in which "assemble/disassemble" is operated.

In the example illustrated in FIG. 4, it is assumed that two of the files 222 and 226 are selected among three of the files 222, 224, and 226 on the work space 136 and the "assemble/disassemble" 238 is operated.

Out of two of the files 222 and 226, the previously selected file 222 has priority, and a page of the other file 226 is added after the last page of the file 222 having priority. The other file 226 of which the page is added is deleted from the work space 136.

In a case where one file is selected and the "assemble/disassemble" 238 is operated, each page of the selected file is disassembled into separate files.

The file search unit 240 on the menu bar 230 is used to search for a file stored in the folder 130 of the management folder group 102. A search key is input to the file search unit 240, and a file search unit 112 of the work management application 110 executes a search of the file by using the key.

The file search unit 112 corresponds to an example of a search section according to the exemplary embodiment of the present invention.

Next, generation and storage of relevant data will be described. As described above, generation and storage of relevant data are performed in a case where one of the operation items the "temporary save" 234 and the "return to original" 236 is selected.

Figure 5:
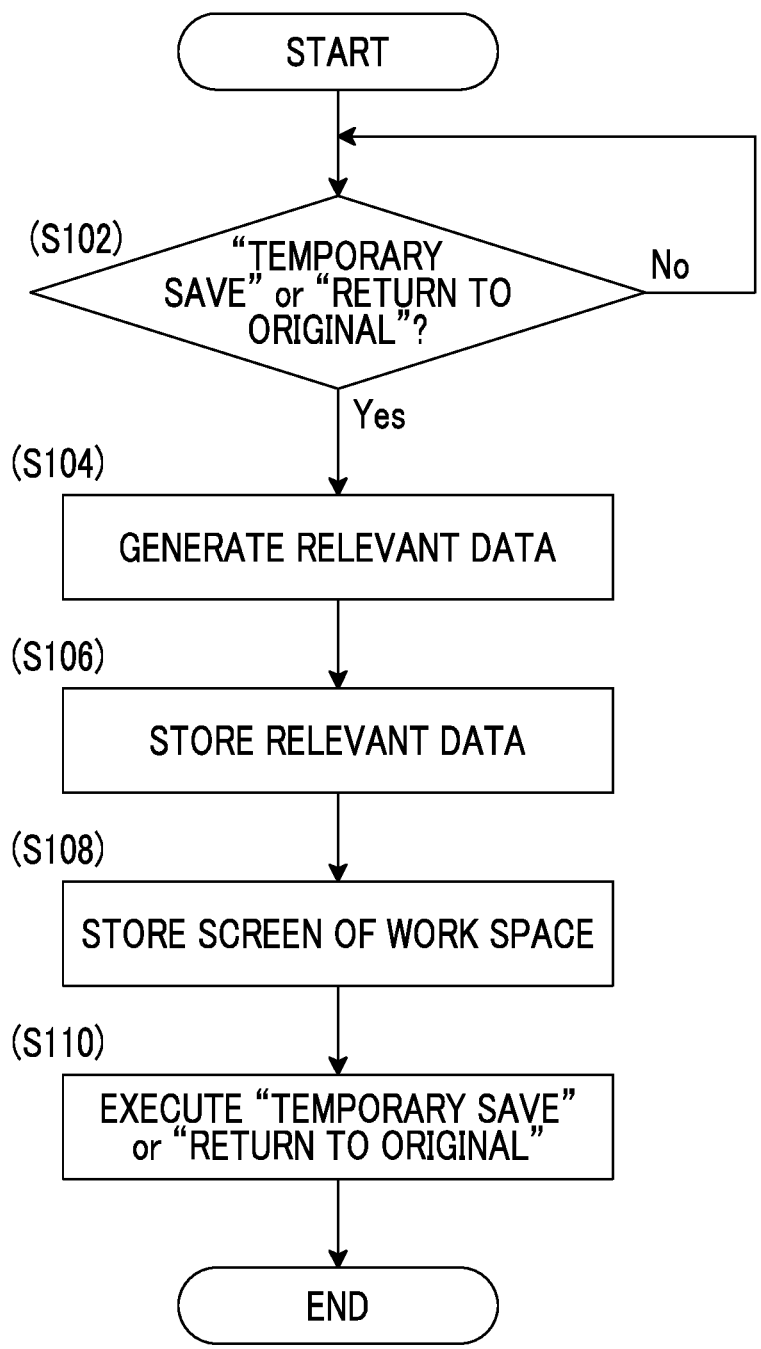
FIG. 5 is a flowchart illustrating a processing procedure in a case where "temporary save" and "return to original" are selected and operated.

FIG. 5 is a flowchart illustrating a processing procedure in a case where "temporary save" and "return to original" are selected and operated.

In a case where the procedure illustrated in FIG. 5 is started, in step S102, a standby state is maintained until one of the operation items of the "temporary save" 234 and the "return to original" 236 is selected. In a case where one of the operation items of the "temporary save" 234 and the "return to original" 236 is selected, at step S104, relevant data of associating each of the files 222, 224, and 226 on the work space 136 is generated. Since an operation performed on each of the files 222, 224, and 226 on the work space 136 is finally reflected in each file stored in an original folder, the relevant data associates copy sources of the respective files 222, 224, and 226 with each other.

A data generation unit 124 in the file association unit 122 of the work management application 110 generates the relevant data. The file association unit 122 corresponds to an example of an association section according to the exemplary embodiment of the present invention. As relevant data, relevant data of associating all of the files 222, 224, and 226 on the work space 136 with each other may be generated, but in the present exemplary embodiment, a basic file is used as a representative file of relevant files, and relevant data of associating the basic file, which is a representative file, with another file is generated.

In a case of generating the relevant data, a degree of association between the files is calculated.

FIG. 6 is a table illustrating an evaluation reference of a degree of association.

As evaluation references of a degree of association, seven evaluation references are illustrated in FIG. 7.

In an evaluation reference of "degree of coincidence by file name", the higher the degree of coincidence of a word used for "file name" among the management items illustrated in FIG. 3, the higher the degree of association is obtained. A degree of association in the evaluation reference of "degree of coincidence by file name" is given a weight of, for example, 20 to 100 of the seven evaluation references.

In an evaluation reference of "degree of coincidence by attribute", the higher the degree of coincidence of a word used for "attribute" among the management items illustrated in FIG. 3, the higher the degree of association is obtained. A degree of association in the evaluation reference of "degree of coincidence by attribute" is given a weight of, for example, 15.

In an evaluation reference of "degree of coincidence by feature word extraction of file contents", feature word extraction is performed by a known technology based on "content" among the management items illustrated in FIG. 3, the higher the degree of coincidence of an extracted feature word, the higher the degree of association is obtained. A degree of association in the evaluation reference of "degree of coincidence by feature word extraction of file contents" is given a weight of, for example, 10.

In an evaluation reference of "space in work space", based on "positional relationship" among the management items illustrated in FIG. 3, the closer the distance, the higher the degree of association is obtained. A degree of association in the evaluation reference of "space in work space" is given a weight of, for example, 20.

In an evaluation reference of "execution state of assembling/disassembling", in a case of being assembled by the operation item of the "assemble/disassemble" 238 illustrated in FIG. 2, a high degree of association is obtained, and in a case of being disassembled, a low degree of association is obtained. A degree of association in the evaluation reference of "execution state of assembling/disassembling" is given a weight of, for example, 15.

In an evaluation reference of "display time to work space", based on "display time to work space" among the management items illustrated in FIG. 3, the shorter the time difference of display, the higher the degree of association is obtained. A degree of association in the evaluation reference of "display time to work space" is given a weight of, for example, 20.

The degree of association obtained by each evaluation reference is added by weighting to calculate a degree of association out of files. The degree of association and data indicating the associated file are combined to generate relevant data.

FIG. 7 is a diagram illustrating an example of relevant data generated based on management items illustrated in FIG. 3.

The relevant data illustrated in FIG. 7 is data representing a relevant file group associated with a basic file. The relevant data includes items of "file name", "degree of association", and "original position". The item of "file name" describes a file name of each file included in the relevant file group. The item of "degree of association" describes a value of a degree of association representing a relation between each file and the basic file. In the "original position", a path indicating where an original file of each file is stored is described as a relative path based on the original file of the basic file. By describing the "original position" in this way, the relevant data is substantially data of associating original files with each other.

In this manner, in a case where relevant data is generated in step S104 in FIG. 5, this relevant data is stored in a relevant data folder 132 included in the management folder group 102 in step S106, for example. A data storage unit 126 in the file association unit 122 of the work management application 110 stores the relevant data. The data storage unit 126 corresponds to an example of a storage section according to the exemplary embodiment of the present invention.

In this manner, in a case where the relevant data is stored in step S106, in the present exemplary embodiment, in step S108, a screen on which each of the files 222, 224, and 226 is arranged on the work space 136 (that is, an image of the file display field 220 illustrated in FIG. 2 is stored. A screen storage unit 128 in the file association unit 122 of the work management application 110 stores the screen. The screen storage unit 128 corresponds to an example of a storage section according to the exemplary embodiment of the present invention.

A storage location of the screen is, for example, a storage screen folder 134 included in the management folder group 102. This screen visually indicates a relation among the respective file 222, 224, and 226 during work, and reminds the user of the relation among the respective file 222, 224, and 226.

In a case where the screen of the work space is stored in step S108, the process described above is executed in step S110 according to the selected operation of "temporary save" 234 and "return to original" 236, the procedure illustrated in FIG. 5 is completed.

As a format of the relevant data, in addition to a format of the relevant data illustrated in FIG. 7 collectively indicating a relation among the files based on the basic file, a format of relevant data of individually indicating a relation with the basic file for each file may also be considered.

FIG. 8 is a diagram illustrating another example of the relevant data.

Relevant data illustrated in FIG. 8 indicates a relation between the file and the basic file described in a second row of the table of FIG. 7. The storage location of the relevant data is a relevant file itself associated with the basic file, and is, for example, added to the relevant file and stored as one of attributes.

Regardless of a format of the relevant data, the relevant data is accumulated each time work is performed in the work space 136. In addition, in a case where the already associated file is used again in the work space 136, a new degree of association in which the previous degree of association is also considered is calculated and the relevant data is corrected. For example, in a case where the file management system 100 is used by a team, each member belonging to the team works in the work space 136, so that a tendency of use of the file as the whole team is accumulated. Further, for example, in a case where only one user uses the file management system 100, a tendency of personal use of the user who uses the file is accumulated.

Hereinafter, a method of using relevant data generated and stored as described above will be described.

The relevant data is used, for example, at the time of displaying a file in the work space, so that work efficiency is achieved.

Figure 9:
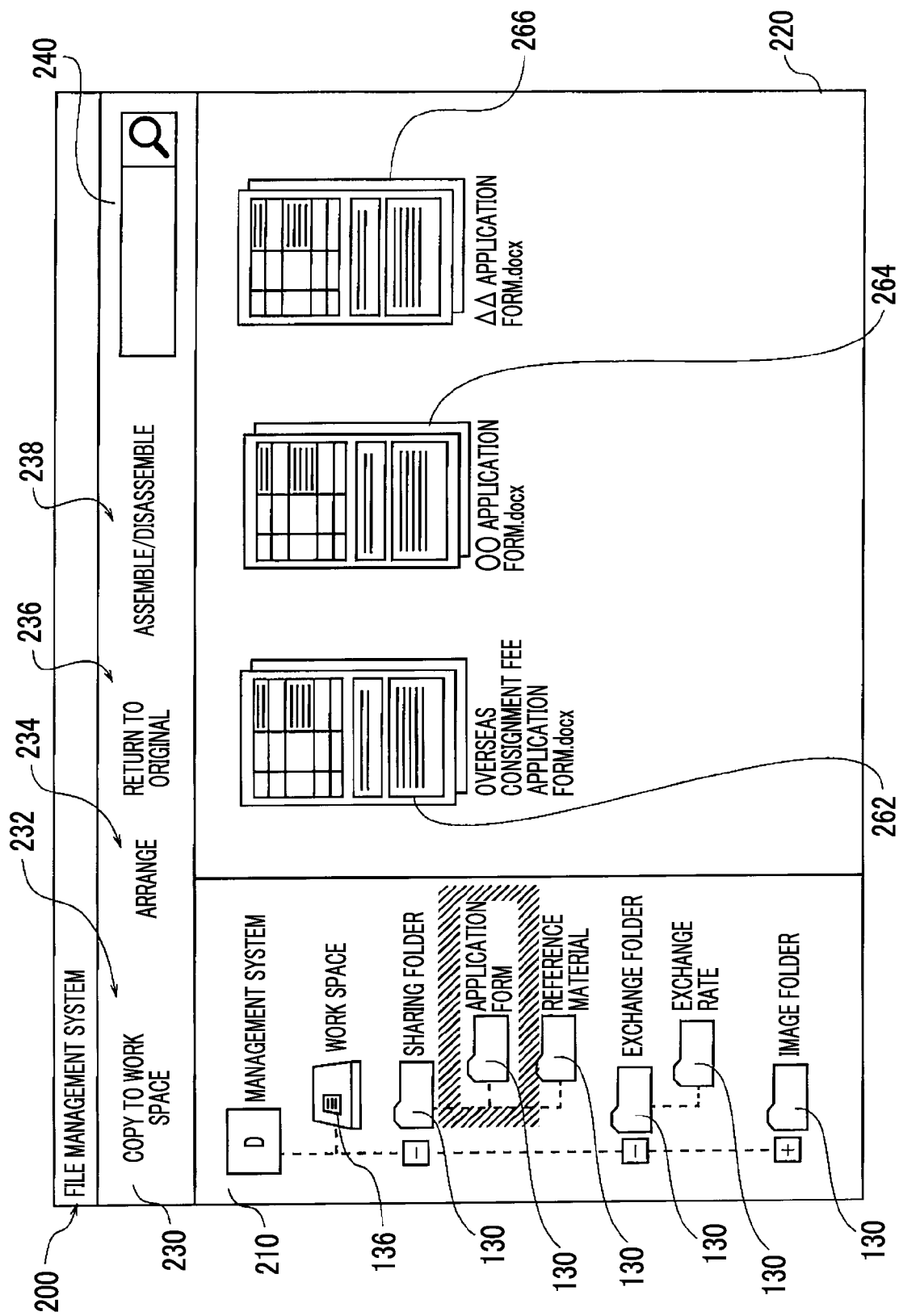
FIG. 9 is a diagram for explaining display of a file on a work space.

FIG. 9 is a diagram for explaining display of a file on a work space.

FIG. 9 illustrates a state in which the folder 130 of an application form is selected in the folder display field 210 of the file management screen 200. A plurality of files 262, 264, and 266 are stored in the folder 130 of this application form, and among the files 262, 264, and 266, the file 262 illustrated at the left end is an original file corresponding to the basic file (that is, the upper left file 222) illustrated in FIG. 2. In a case where this original file is selected and the operation item of the "copy to work space" 232 is selected, relevant data is used as described below, and a relevant file is also collectively displayed to the work space 136 together with the selected basic file.

Figure 10:
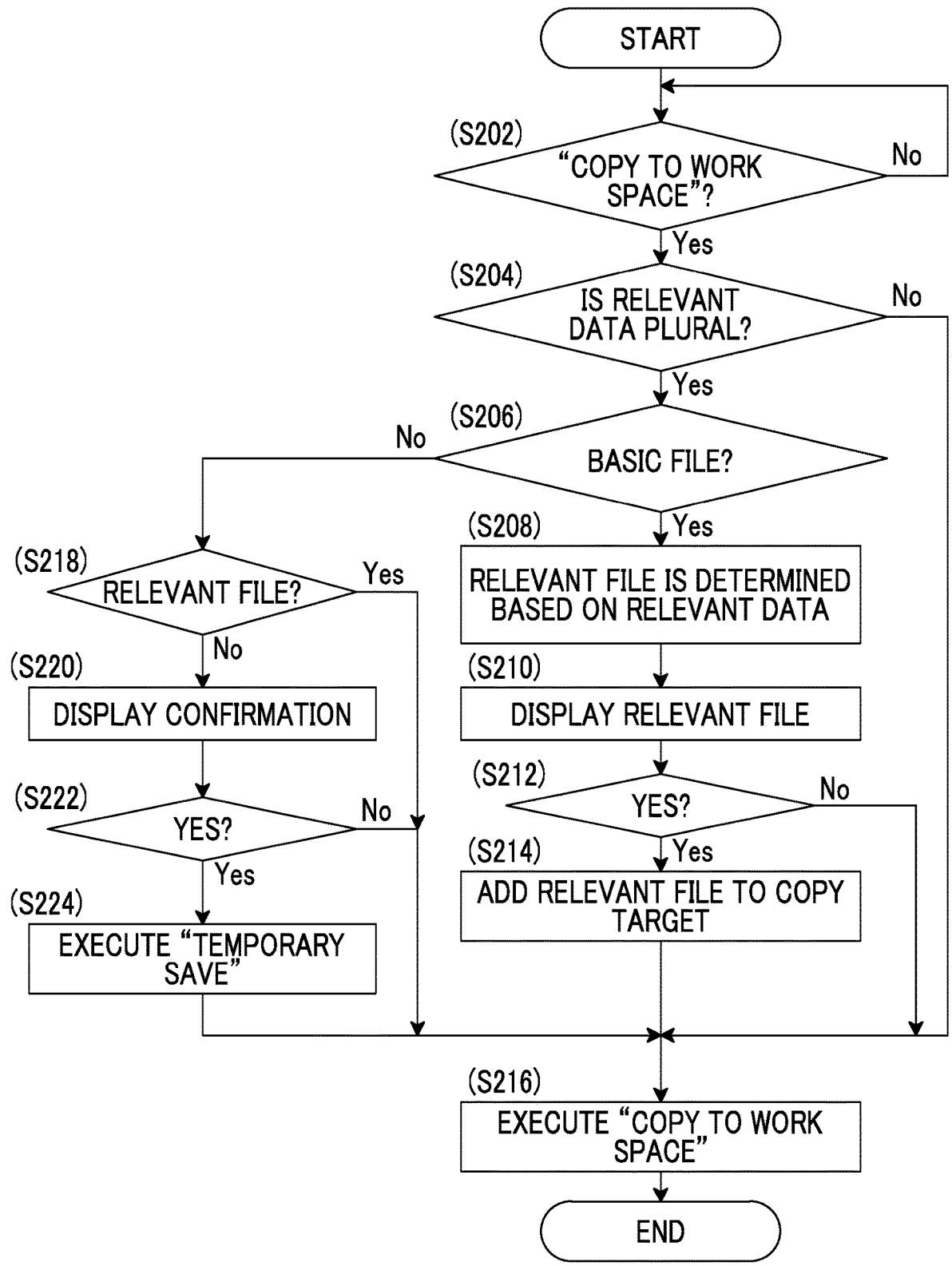
FIG. 10 is a flowchart illustrating a processing procedure in a case where "copy to work space" is selected and operated.

FIG. 10 is a flowchart illustrating a processing procedure in a case where "copy to work space" is selected and operated.

In a case where the procedure illustrated in FIG. 10 is started, in step S202, a standby state is maintained until the operation items of the "copy to work space" 232 is selected. In a case where the "copy to work space" 232 is selected, the accumulated number of pieces of relevant data is determined in step S204. For example, in a case where the file management system 100 is used by a team and the accumulated number is small, it is considered that a relation represented by the relevant data does not converge on a tendency of the entire team and an appropriately relevant file is not obtained. On the other hand, for example, in a case where only one user uses the file management system 100, even in another case where the accumulated number of pieces of relevant data is small, it is considered that a tendency of the user is reflected in a relation represented by the relevant data. Therefore, in step S204, a threshold value according to a use status of the file management system 100 is prepared, and in a case where the number of pieces of relevant data exceeding the threshold value is accumulated, the process proceeds to step S206 and the relevant data is used.

In step S206, it is determined whether a first file is displayed (that is, a basic file is displayed) or a second or subsequent file is displayed in the work space 136. In a case where the basic file is displayed, the process proceeds to step S208, and a relevant file associated with the basic file is determined based on relevant data. In a case where the relevant data is in the format illustrated in FIG. 7, the relevant data stored in the relevant data folder 132 is referred to and the relevant file associated with the basic file is determined. In addition, for example, in a case where the relevant data is in the format illustrated in FIG. 8, a file in each folder located up to two ahead by tracing a tree is searched, from a storage folder of the basic file. The relevant data added as an attribute to each file, for example, is referred to, and the relevant file associated with the basic file is determined.

In a case where the relevant file is determined, it is suggested that the relevant file is displayed to the user and is displayed in the work space along with the basic file.

Figure 11:
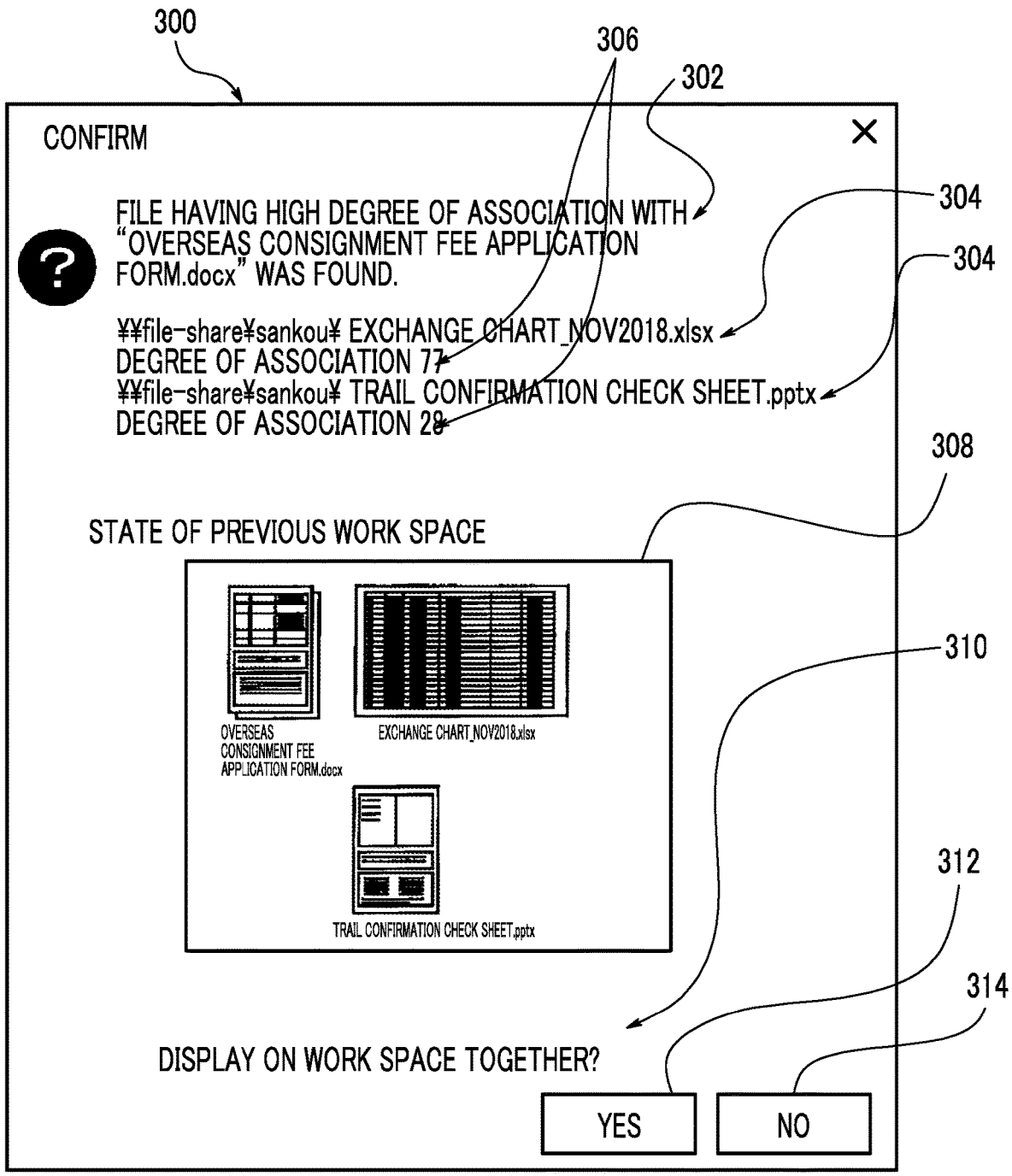
FIG. 11 is a diagram illustrating a screen for confirming display of a relevant file in the work space by a user.

FIG. 11 is a diagram illustrating a screen for confirming display of a relevant file in the work space by a user.

On a confirmation screen 300 illustrated in FIG. 11, a notification text 302 for notifying that a file having a high degree of association with a basic file is found, and a found relevant file 304 are displayed. In addition, the relevant file 304 to which a degree of association 306 is also attached is displayed. The user determines whether or not the file is a file to be used for work with the basic file, based on these displays.

In addition, the confirmation screen 300 illustrated in FIG. 11 also displays a storage screen 308 of a work space, in which the selected basic file is used before, among screens stored in the storage screen folder 134. The storage screen 308 allows the user to intuitively understand a content of the previous work, a relation between files, or the like, and also understand a necessity of the relevant file 304 in the current work.

The confirmation screen 300 also displays a query text 310 for displaying the relevant file 304 and the work space together with the basic file, and a YES button 312 and a NO button 314 are prepared. After examining whether to or not to display the relevant file 304, the user operates either of the YES button 312 or the NO button 314 with, for example, a mouse, and responds with availability of the display.

In step S212 in FIG. 10, a content of the response of the user is confirmed, and in a case of "Yes", in step S214, the relevant file is displayed as a target to be copied to the work space 136. Thereafter, in step S216, a copy of each file to be copied is displayed in the work space 136.

As described above, since the relevant file is also collectively displayed in the work space in a case where the response of the user is "Yes" in step S212, time and effort for searching for the relevant file and displaying the relevant file individually in the work space are saved and work efficiency is improved.

In a case where the response of the user is "No" in step S212, the relevant file is not displayed as a copy target, the process proceeds to step S216, and only the basic file is displayed in the work space. In addition, since a relation represented by the relevant data is considered to be inaccurate in a case where the response of the user is "No", the relevant data may be corrected to reduce a degree of association.

In step S206, in a case where it is determined that the second or subsequent file is displayed, the process proceeds to step S218, and it is determined whether or not there is relevant data of associating the file instructed to be currently displayed for the basic file already displayed in the work space 136 (that is, the currently displayed file is a relevant file for the basic file). In a case where the relevant data in which the file instructed to be currently displayed and the basic file are associated with each other is not found, the process proceeds to step S220 and a confirmation on display of the file instructed to be displayed is displayed.

Figure 12:
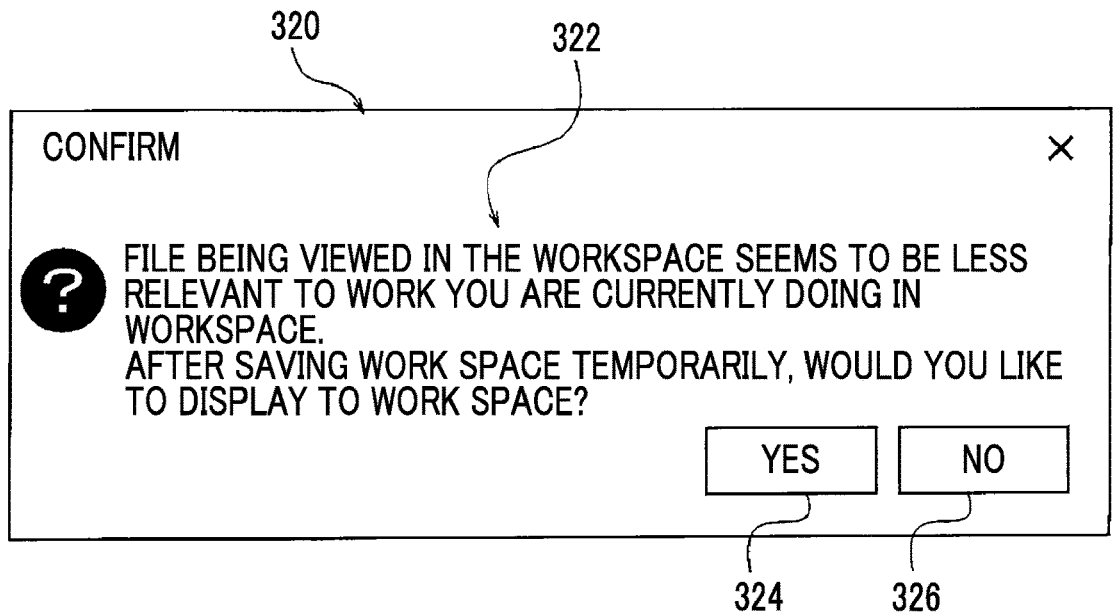
FIG. 12 is a diagram illustrating a screen for confirming display of a file which is not a relevant file.
Figure 13:
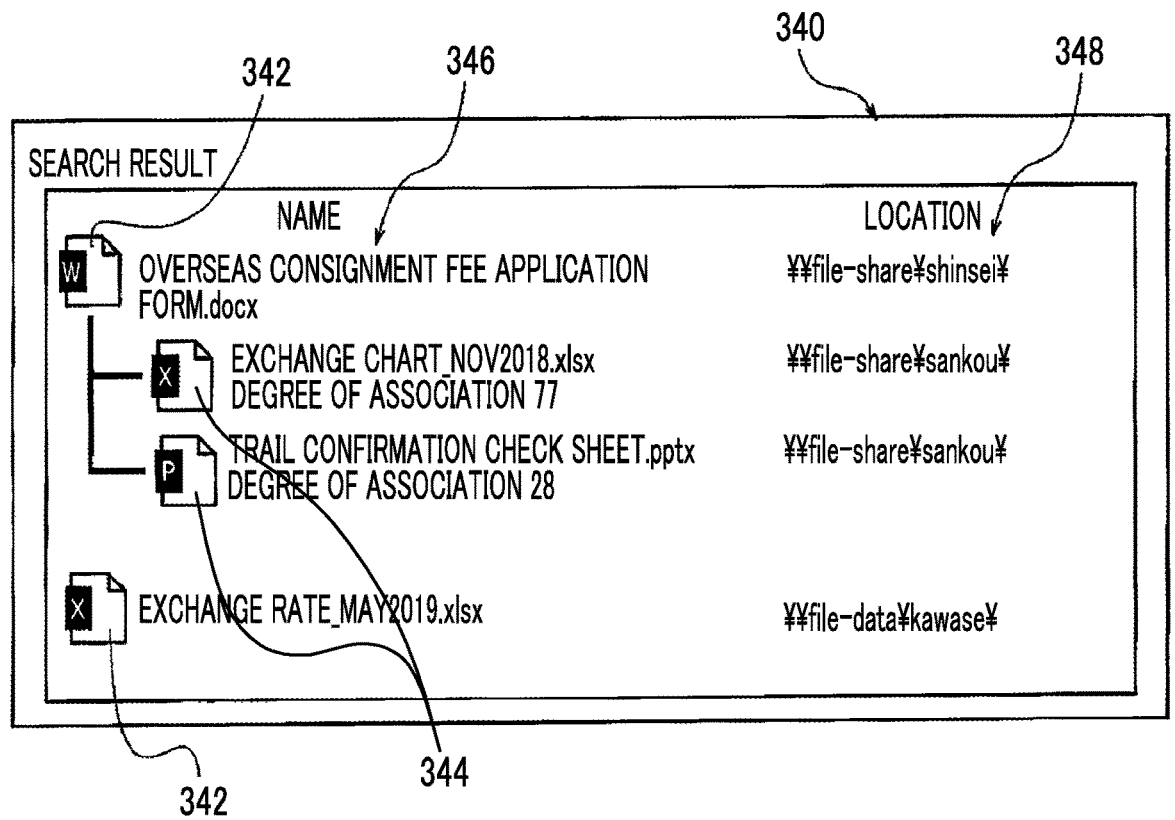
FIG. 13 is a diagram illustrating a search result screen on which a search result is presented.

FIG. 12 is a diagram illustrating a screen for confirming display of a file having a low degree of association with a basic file.

On a confirmation screen 320 illustrated in FIG. 12, a confirmation text 322 including a notice that a currently selected file is a file having a low relation to a basic file and a question whether to display a copy after temporarily storing the file in a work space is displayed. In addition, a Yes button 324 and a No button 326 are prepared, and after examining whether to or not to temporarily store the work space, the user operates either the Yes button 324 or the No button 326 with, for example, a mouse and temporarily stores the work space, and responds with availability of the temporary storing.

In step S222 in FIG. 10, a content of the response of the user is confirmed, and in a case of "Yes", in step S224, the work space is temporarily stored. In this manner, by determining whether or not the file instructed to be displayed has a relation to the basic file, it is possible to prevent the file having a low relation to the work space from being displayed. Thereafter, in step S216, the current display file is displayed on the work space as a new basic file. As a result, in a case of displaying the file having a low relation to the work space, it is possible to temporarily store the currently displayed work space and perform an operation in a new work space.

On the other hand, in a case where it is determined that the file instructed to be displayed is a relevant file to the basic file in step S218, or in a case where the response of the user is "No" in step S222 in a case where the file is not a relevant file to the basic file, the process proceeds to step S216 and the file instructed to be displayed is displayed in the current work space. In this manner, the file displayed in the work space 136 is associated with the basic file at the time of selecting "temporary save" or "return to original", and new relevant data is generated or previous relevant data is corrected.

Next, a method of using relevant data at the time of searching for a file will be described.

By using relevant data, for example, in a case of searching for a file via the search unit 240 of the file management screen 200, work efficiency is achieved.

In a case of searching for a file, and in a case where a file corresponding to a search key is searched and the file corresponding to the key is found, a file associated with the found file is confirmed with relevant data. As a search result, both the file corresponding to the key and the file associated with the file are displayed.

Figure 14:
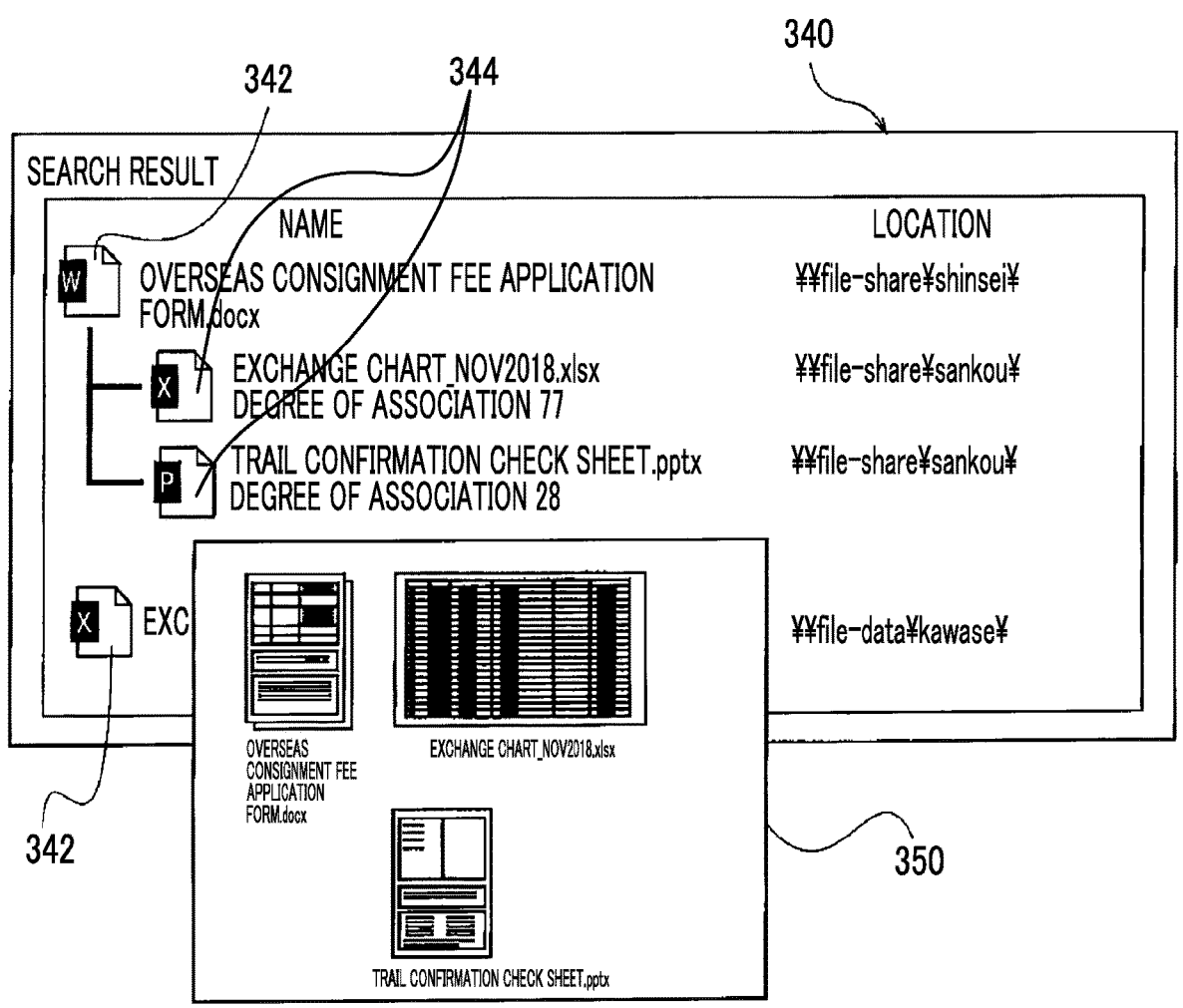
FIG. 14 is a diagram illustrating a storage screen of the work space displayed together with the search result.

FIG. 14 is a diagram illustrating a result display screen on which a search result is displayed.

A result display screen 340 displays a file name 346 and a storage location 348 for a file 342 corresponding to a search key, and also stores the file name 346 and the storage location 348 for a relevant file 344 associated with the file 342. The relevant file 344 is displayed, for example, in descending order of a degree of association, and is displayed together with, for example, a value of the degree of association. In addition, the association between files is visually indicated by, for example, a tree display. These display methods help a searcher to understand the relationship between the files. Specifically, the display of visual association is useful since the association is intuitively understood.

By seeing such search results, the searcher recognizes a file which cannot be found by the search key such as a file mostly having image contents, for example, as long as the file has a high a relation, along with the file found with the search key, search efficiency is improved.

Further, in the present exemplary embodiment, among storage screens of a work space stored in the storage screen folder 134, a storage screen in a case where a file found by a key and a relevant file are associated with relevant data is also displayed together with a search result.

FIG. 14 is a diagram illustrating a storage screen of the work space displayed together with the search result.

A storage screen 350 of a work space is displayed, for example, in a case where one of files found with the key is selected by, for example, a mouse operation or the like. The display of the storage screen 350 is displayed, for example, in the vicinity of the relevant file 344 on a pop-up screen.

As the searcher confirms the storage screen 350, the searcher intuitively understands a work content, a relation between the files, or the like, so that it is easy to determine whether the relevant file 344 is a file appropriated to the purpose of the search.

The relevant data can be utilized in various ways for work efficiency in the work space.

Although the exemplary embodiment of the present invention is invented for the purpose of addressing the problem described above, the configuration of the exemplary embodiment of the present invention does not prevent diversion to other purposes without addressing the problem, and a form in which the configuration of the exemplary embodiment of the present invention is diverted is also one embodiment of the exemplary embodiment of the present invention.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a processor, configured to:
perform control of displaying a plurality of files stored in a real storage area on a display area representing a virtual storage area; and
generate relevant data in which the plurality of files displayed on the display area are associated with each other; and
a memory, configured to:
store the relevant data in a referable location in a case where the display area is hidden,
wherein the relevant data is a combination of degree of association and data indicating the plurality of files, and the degree of association is a weighted sum of a plurality of evaluation references,
wherein the plurality of evaluation references comprises degree of coincidence by file name, degree of coincidence by attribute, degree of coincidence by feature word extraction of file contents, space in work space, execution state of assembling or disassembling, and display time on the display area.

2. The information processing apparatus according to claim 1, wherein the processor further reflects editing of a file on the display area into a storage file, which corresponds to the file, stored in the real storage area.

3. The information processing apparatus according to claim 1,
wherein in a case where editing for assembling the plurality of files on the display area is performed, the processor associates the files with each other more strongly than in a case where the editing is not performed.

4. The information processing apparatus according to claim 2,
wherein in a case where editing for assembling the plurality of files on the display area is performed, the processor associates the files with each other more strongly than in a case where the editing is not performed.

5. The information processing apparatus according to claim 1,
wherein the processor changes a display position of a file on the display area in accordance with an operation of an operator, and
in a case where a distance between the files on the display area is a first distance, the processor associates the files with each other more strongly than in a case where the distance between the files is a second distance longer than the first distance.

6. The information processing apparatus according to claim 2,
wherein the processor changes a display position of the file on the display area in accordance with an operation of an operator, and
in a case where a distance between the files on the display area is a first distance, the processor associates the files with each other more strongly than in a case where the distance between the files is a second distance longer than the first distance.

7. The information processing apparatus according to claim 3,
wherein the processor changes a display position of a file on the display area in accordance with an operation of an operator, and
in a case where a distance between the files on the display area is a first distance, the processor associates the files with each other more strongly than in a case where the distance between the files is a second distance longer than the first distance.

8. The information processing apparatus according to claim 4, wherein the processor changes a display position of the file on the display area in accordance with an operation of an operator, and in a case where a distance between the files on the display area is a first distance, the processor associates the files with each other more strongly than in a case where the distance between the files is a second distance longer than the first distance.

9. The information processing apparatus according to claim 5,
wherein the processor associates the files with each other in a case where the files are within a specific distance on the display area, and does not associate the files in a case where the files are outside the specific distance.

10. The information processing apparatus according to claim 6,
wherein the processor associates the files with each other in a case where the files are within a specific distance on the display area, and does not associate the files in a case where the files are outside the specific distance.

11. The information processing apparatus according to claim 7,
wherein the processor associates the files with each other in a case where the files are within a specific distance on the display area, and does not associate the files in a case where the files are outside the specific distance.

12. The information processing apparatus according to claim 8,
wherein the processor associates the files with each other in a case where the files are within a specific distance on the display area, and does not associate the files in a case where the files are outside the specific distance.

13. The information processing apparatus according to claim 1, wherein in a case where a time difference when a file is displayed on the display area is a first time difference, the processor associates the files with each other more strongly than in a case where the time difference when the file is displayed on the display area is a second time difference longer than the first time difference.

14. The information processing apparatus according to claim 13,
wherein the processor associates the files with each other in a case where the time difference when the file is displayed on the display area is within a specific time difference, and does not associate the files in a case where the time difference when the file is displayed on the display area is outside the specific time difference.

15. The information processing apparatus according to claim 1,
wherein in a case of displaying a file displayed at least once on the display area, the processor also displays a file associated with the file in the relevant data on the display area.

16. The information processing apparatus according to claim 15,
wherein the processor presents the file associated with the file in the relevant data in a case of displaying the file as a display candidate on the display area, and receives an instruction for permitting the display to display the display candidate on the display area.

17. The information processing apparatus according to claim 1, wherein the processor searches for a file stored in the real storage area,
wherein in a case of presenting the file found in the search, the processor also presents a file associated with the file in the relevant data.

18. The information processing apparatus according to claim 17,
wherein the processor visually presents the file found in the search and a file associated with the file to correspond to each other.

19. The information processing apparatus according to claim 16,
wherein the processor changes a display position of the file on the display area in accordance with an operation of an operator,
the memory further stores a display state of a file on the display area at the time of generating the relevant data as an image, and
in a case of presenting the associated file, the image stored in the memory is displayed.

20. A non-transitory computer readable medium storing an information processing program causing an information processing apparatus to operate as:
a processor, configured to:
perform control of displaying a plurality of tiles stored in a real storage area on a display area representing a virtual storage area; and
generate relevant data in which the plurality of files displayed on the display area are associated with each other; and
a memory, configured to:
store the relevant data in a referable location in a case where the display area is hidden,
wherein the relevant data is a combination of degree of association and data indicating the plurality of files, and the degree of association is a weighted sum of a plurality of evaluation references,
wherein the plurality of evaluation references comprises degree of coincidence by file name, degree of coincidence by attribute, degree of coincidence by feature word extraction of file contents, space in work space, execution state of assembling or disassembling, and display time on the display area.

21. The information processing apparatus according to claim 1, wherein a relevant file is determined based on the relevant data on a selected file.

22. The information processing apparatus according to claim 21, wherein the relevant file is displayed on the display area in accordance of an operation of an operator.

23. The information processing apparatus according to claim 1,
wherein the degree of coincidence by the file name represents a degree of coincidence of a word used for the file name,
wherein the degree of coincidence by the file name increases, the degree of association increases.

24. The information processing apparatus according to claim 1,
wherein the degree of coincidence by attribute represents a degree of coincidence of a word used for the attribute,
wherein the degree of coincidence by the attribute increases, the degree of association increases.

25. The information processing apparatus according to claim 1,
wherein the degree of coincidence by feature word extraction of file contents represents a degree of coincidence of the feature word extraction based on the file contents,
wherein the degree of coincidence by feature word extraction of file contents increases, the degree of association increases.

26. The information processing apparatus according to claim 1,
wherein the space in work space represents a positional relationship between the plurality of files,
wherein the space in work space decreases, the degree of association increases.

27. The information processing apparatus according to claim 1,
wherein the execution state of assembling or disassembling represents an execution state of the plurality of files,
when the plurality of files are assembled, the degree of association increases,
when the plurality of files are disassembled, the degree of association decreases.

28. The information processing apparatus according to claim 1,
wherein, the display time on the display area represents a time of the plurality of files being displayed on the display area,
wherein a time difference of the plurality of files being displayed decreases, the degree of association increases.

* * * * *